MAGNETIC MULTIHEAD ASSEMBLY WITH SHIELDING MEANS

Filed Dec. 9, 1966 Sheet 1 of 3

INVENTOR
CHARLES H. STAPPER
BY John F. Ostendorf
ATTORNEY

United States Patent Office 3,432,839
Patented Mar. 11, 1969

3,432,839
MAGNETIC MULTIHEAD ASSEMBLY WITH SHIELDING MEANS

Charles H. Stapper, Fridley, Minn., assignor to International Business Machines Corporation, Armonk, N.Y., a corporation of New York Continuation-in-part of application Ser. No. 390,043, Aug. 17, 1964. This application Dec. 9, 1966, Ser. No. 600,586
U.S. Cl. 340—174.1 6 Claims
Int. Cl. G11b 5/40

ABSTRACT OF THE DISCLOSURE

A magnetic transducer in which feedthrough noise between heads thereof is reduced by the provision of a conductive coating inlaid over the operating surface to cover portions of the pole faces of the heads and reduce their ability to transmit and receive feedthrough noise. Additional shield means positioned in the transducer between the heads is exposed at the operating surface through the conductive coating to act as a magnetic sink for feedthrough. Configurations of the additional shielding means and shapes of the pole pieces providing improved results are disclosed.

This application is a continuation-in-part of application Ser. No. 390,043 filed Aug. 17, 1964 in the name of Charles H. Stapper and entitled "Tape Transducer Apparatus," now abandoned.

This invention relates to magnetic recording apparatus and, more particularly, to magnetic recording tape transducer apparatus capable of being utilized at frequencies in the megacycle range without the adverse effects of electromagnetic radiation.

Many recording systems employ magnetic heads having a plurality of transducing gaps. In such heads, one gap is employed for writing and a second for reading and verifying or checking the written information to increase the reliability of the recording system. When the heads are in use, noise interference usually occurs between the write and read circuits.

In one form, this interference may occur due to lead coupling, including capacitive coupling, between the circuits and connecting elements or from unshielded elements. Another form of interference is ohmic coupling resulting from poor ground connections or head windings. This invention is not concerned with these types of coupling as it is readily known that they can be corrected or compensation made for them by shielding to reduce the lead coupling or increasing the conductivity of the shields to eliminate the ohmic coupling.

A third type of noise interference coupling results from field interactions. This type of coupling is called "feedthrough" noise and is the most detrimental form of noise coupling. It is caused by radiation across the recording surface of the magnetic transducer head due to the electromagnetic field as contrasted to the electric field only or magnetic field only. This invention is concerned with this problem and with the elimination of this form of coupling.

Accordingly, it is a primary object of the invention to provide improved magnetic recording apparatus.

It is another object of the invention to provide magnetic recording apparatus substantiallly free from any noise interference caused by electromagnetic radiation and having well-defined electromagnetic fields.

In the past, recording systems with plural gap heads have compensated for "feedthrough" noise by employing externally positioned elements, such as H shields, protruding shields mounted transversely in the transducer assembly, and in some instances, shielding materials have been employed as a part of the tape record which traverses the transducer assembly. In applications where operating frequencies in the megacycle (mc.) range are involved, these shields are less effective and are delicate and costly. In other applications, the physical geometry of the recording system renders it impossible to utilize any form of externally positioned shield.

Thus, it is another object of the invention to provide electromagnetic radiation shielding as an integral part of the transducer assembly.

It is a further object of the invention to provide tape transducer apparatus having electromagnetic radiation shielding to permit transducing in the megacycle frequency range without requiring any externally positioned shielding elements.

In accordance with an aspect of the invention, there is provided tape transducer apparatus operable in the megacycle frequency range without noise interference from electromagnetic radiation and with focused electromagnetic fields. The apparatus comprises a write head member and another head member which is preferably disposed in the same longitudinal plane as the write head member. The head members are retained in nonmagnetic supporting structure to permit a tape recording medium to traverse the head members one after another. Shield means are integrally positioned between the head members and within the electromagnetic circuits of the head members for preventing radiation generated in megacycle operation by the write head from interfering with the other head.

One feature of the invention provides for the shielding means to be a highly conductive layer. The head members are substantially completely undercut except for the shield means, the transducing gaps and the portions of the head pole pieces immediately proximate to the gaps. A conductive layer is inlaid co-extensively in the undercut region permitting the shield means, the gaps and pole piece portions next to the gaps to form part of the surface contacted by the recording medium. In this way, the ability of the write head member to act as a transmitting dipole and the other head member as a receiving dipole is severely restricted. Thus, the "feedthrough" noise from electromagnetic radiation is eliminated.

Another feature of the invention provides for the shield means to be disposed transversely between the write head member and the other head member. In this embodiment of the transducer apparatus, a plurality of laminations of shielding material is disposed parallel to the recording track and, therefore, in the electromagnetic circuit of the system.

The arrangements of the invention have the advantage of providing integrally contained shield members in the transducer apparatus for effecting the elimination of noise interference due to electromagnetic radiation at megacycle range frequencies.

The foregoing and other objects, features and advantages of the invention will be apparent from the following more particular description of the preferred embodiments of the invention, as illustrated in the accompanying drawings; wherein.

Figure 1:
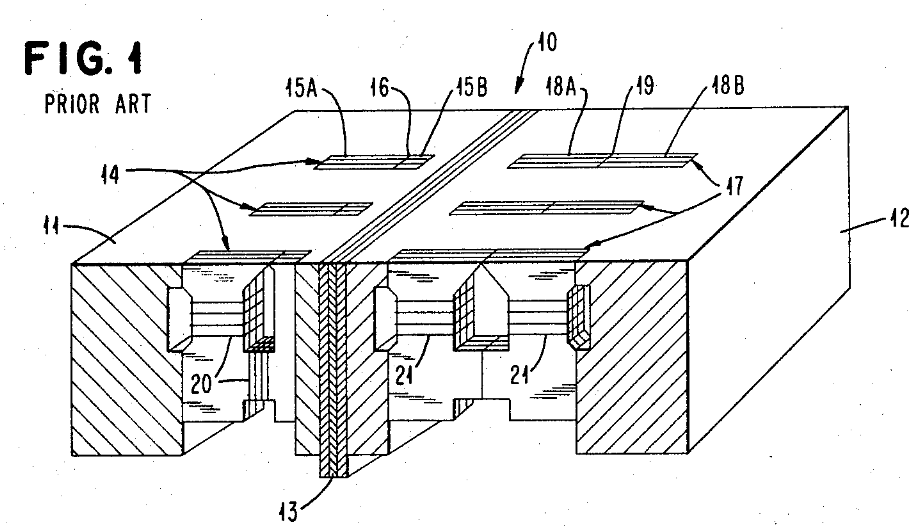
FIG. 1 PRIOR ART
FIGURE 1 is a perspective view partially in section of a typical prior art transducer assembly.

Referring now to FIGURE 1, a typical prior art transducer assembly comprises a supporting structure 10 which may be formed of a suitable nonmagnetic material such as brass. The supporting structure is divided into two sections 11 and 12 separated by a shield 13. Shield 13 is formed of laminations of Mumetal mounted transversely in parallel planes between the sections 11 and 12 of the supporting structure 10.

A plurality of write head members 14 having pole pieces 15*a* and 15*b* are positioned within the portion 11. Each pair of pole pieces defines a transducing gap 16. A plurality of other head members 17 are similarly positioned within the portion 12 of supporting structure. These heads 17 may be used for erasing, reading or verifying the written data. Each of these heads has pole pieces 18*a* and 18*b* which define a transducing gap 19.

The head members 14 and 17 are formed of laminations of ferromagnetic material. The maximum amount of laminations extending through the supporting structure 10 on either side of the gaps 16 and 19 is approximately 0.180 inch. Suitable excitation coils 20 and sensing coils 21 are also mounted on the legs of the head members.

During operation in the megacycle range between 1 and 10 mc., the fields emanating from the write head members change rapidly. Both the electric and magnetic fields emanate from the write head. The laminations 15*a* and 15*b* of the write head members, therefore, act as electromagnetic radiating dipoles. Similarly, the laminations 18*a* and 18*b* of the read head members act as receiving dipoles for the same reason. Thus, a transmission system is provided.

Figure 4:
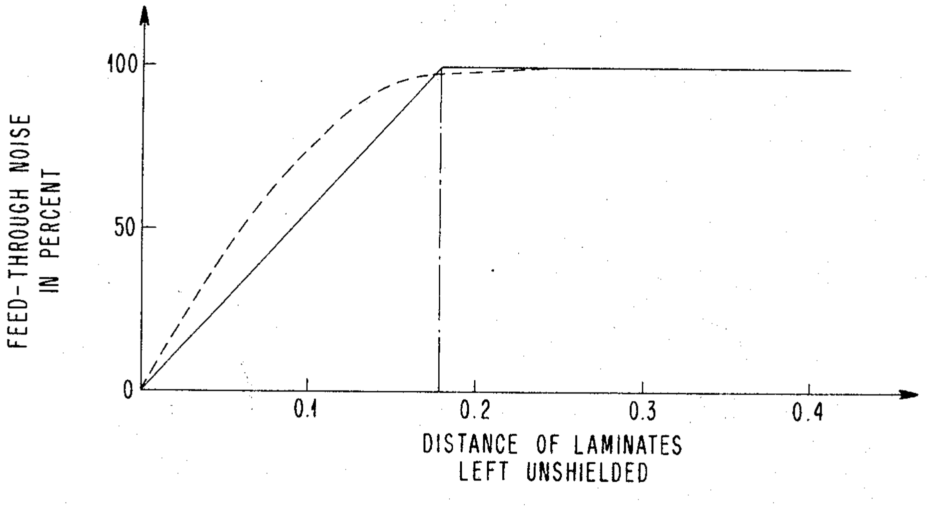
FIGURE 4 is a graph of "feedthrough" noise versus radiating surface of the transducer assembly.

As shown in FIGURE 4, the relationship between the unshielded laminations and "feedthrough" noise indicates that the strength of the electromagnetic field is roughly proportional to the length of the dipole arms. If the head laminations are left totally exposed, the "feedthrough" noise will be at a maximum. However, as the distance of unshielded laminations is reduced by including appropriate shielding in the electromagnetic circuit between the write head members and the other head members, the percentage of "feedthrough" noise is substantially reduced. The theoretical value is shown by the solid line, and the broken line indicates the measured curve.

Figure 2:
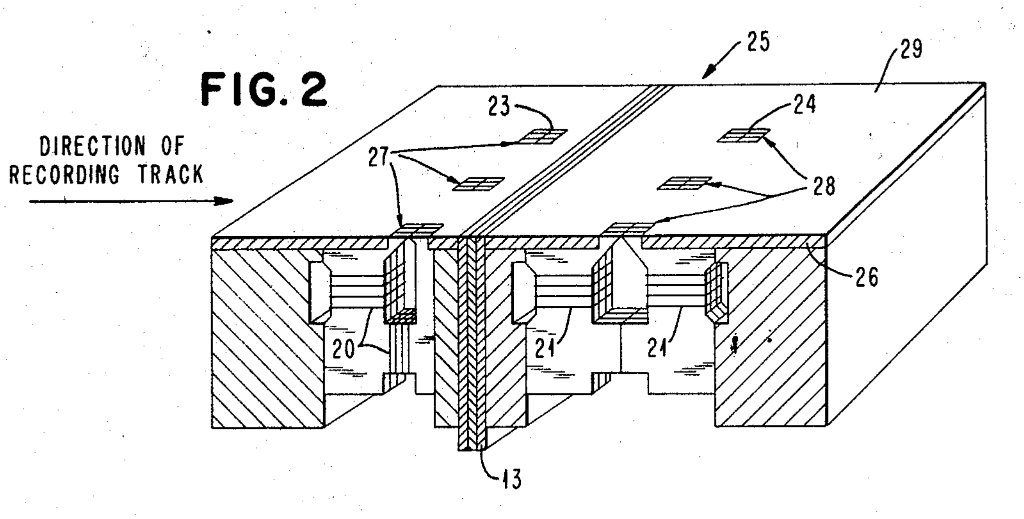
FIGURE 2 is a perspective view partially in section of a transducer assembly according to one embodiment of the invention.

In FIGURE 2, the laminations of the head members have been substantially completely covered leaving only a small portion next to the transducing gaps available to radiate energy and to focus the electromagnetic field. To accomplish this, the supporting structure 25, which again may be formed of a non-magnetic material such as brass, is undercut across substantially its entire upper face 26. Only the shield 13 and small portions of the head laminations 27 and 28 extend above the undercut surface. The head laminations 27 and 28 extend on either side of the transducing gaps 23 and 24, respectively. A conductive material 29, such as copper or silver, is inlaid in the undercut area and, therefore, in the electromagnetic circuit by plating or other method to cover the entire remaining surface. The thickness of the copper may be about 0.003 inch. The unshielded lamination distance on each head member is approximately 0.040 inch, or 0.020 inch or less of the pole piece on each side of the transducing gap.

The copper inlay has the effect of reducing any electromagnetic radiation emanating from the write head members 27 to the other head members 28. As shown in FIGURE 4, the "feedthrough" noise is substantially eliminated, if the pole piece surface extending through the conductive surface is approximately 0.040 inch. In practice, it has been found that this noise has been reduced by ninety-eight percent. The inlay 26 also has the effect of enhancing the electromagnetic focusing of the head members by better defining the electromagnetic field. This leads to increased output signals. An increase between 50 percent and 100 percent has been obtained in practice.

Figure 5:
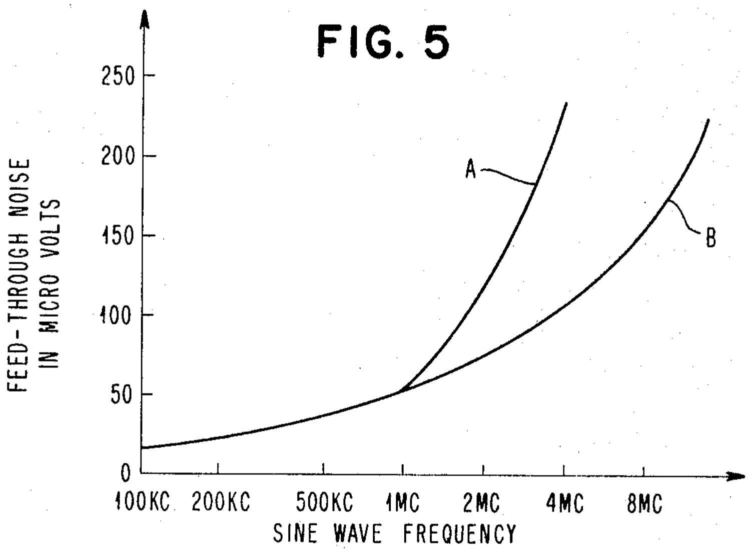
FIGURE 5 is a graph of "feedthrough" noise versus the frequency of operation of the transducing assembly.

Referring to FIGURE 5, a comparison of "feedthrough" noise in microvolts is shown as compared with the frequency of operation. Thus, if the transducer assembly shown in FIGURE 2 is employed at approximately a 2 mc. frequency, the microvolt value of "feedthrough" noise is substantially low (curve A). The level is not sufficient to interfere with the signals transduced by the other head members from a record tape traversing the transducer assembly. In practice, the actual signal-to-noise ratio obtained with the transducer apparatus of FIGURE 2 is between 20 and 30 when the head is employed for reading and writing. When the transducer apparatus of FIGURE 1 is employed, the signal-to-noise ratio is substantially less than one.

Figure 3:
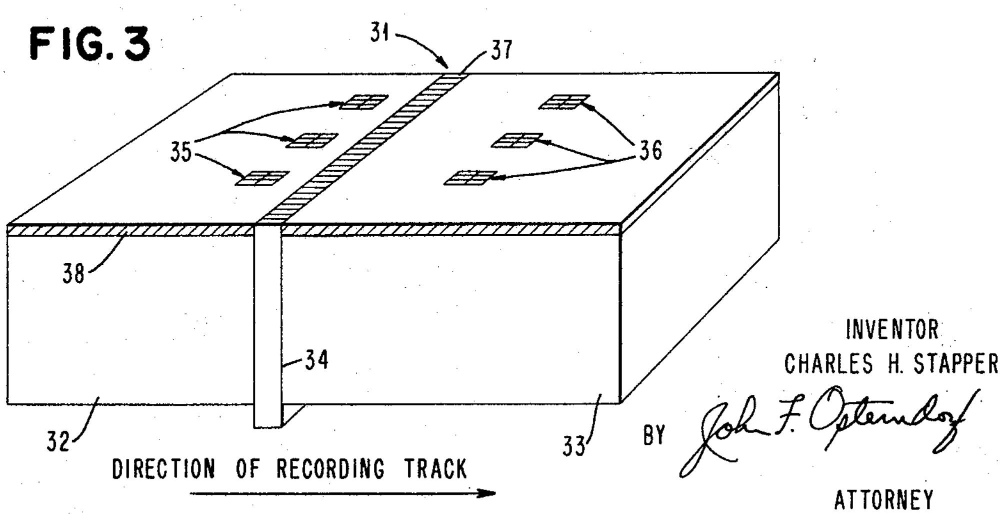
FIGURE 3 is a transducer assembly in perspective of a second embodiment of the invention.

Referring to FIGURE 3, the transducer assembly according to the second embodiment of the invention is particularly suitable for higher frequencies of the order of 8 mc. (refer to curve B of FIGURE 5). In this transducer assembly, supporting structure 31, which may be brass, is divided into two portions 32 and 33 separated by a shield member 34. The portion 32 contains the write head members 35. Similarly, the portion 33 has the other head members 36 mounted in it. Both of the portions 32, 33 are undercut and have a conductive layer 38 disposed in the undercut area as described for the embodiment of FIGURE 2. Additionally, the head members are also provided with excitation coils 20 and sensing coils 21.

The shield member 34, positioned between the portions 32, 33, is formed of alternate laminations 37 of copper and Mumetal. The shield member is approximately 0.040 inch thick between the portions 32, 33 and therefore, it is also a part of the electromagnetic circuit between the write head members and the other head members. The laminations of the shield are parallel to the direction of the recording tracks. This is contrasted with the shield member 13 of FIGURES 1 and 2, which is formed of laminations mounted transversely between the portions of the supporting structure. The shield members 13 and 34 have the effect of reducing the level of any "feedthrough" noise between the write head members and the other head members. The particular configuration of the shield member 34 has been found particularly effective at high frequencies.

Figure 6:
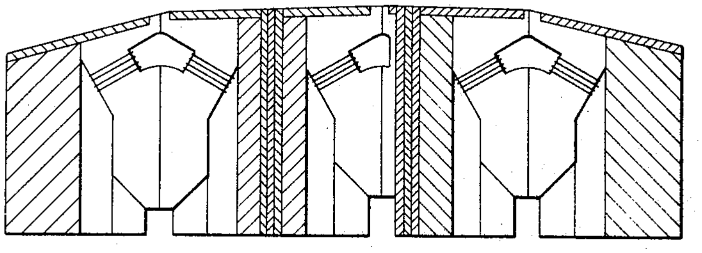
FIGURE 6 is a sectional view of a three gap transducer assembly employing the principles of the invention.

Another form of head assembly which finds practical application is shown in section in FIGURE 6. This transducer assembly has a curved face to accommodate the tape record medium which traverses it. Three distinct banks of head members are employed in this assembly, namely read heads, write heads and read verify heads. The traversed face of the assembly is undercut to accommodate the conductive material in the same manner as described for the apparatus of FIGURE 2. For an 8,000 bit per inch write speed, the average "feedthrough" noise detected in this assembly is 230 microvolts with a maximum of 400 microvolts. The signal-to-noise ratio is 11.5.

Figure 7:
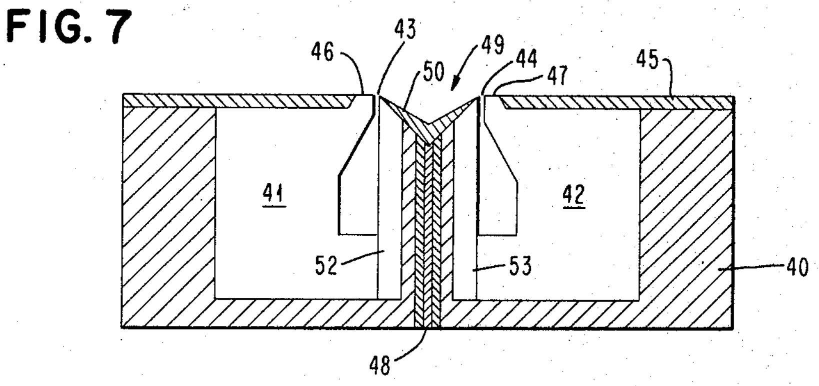
FIGURES 7–9 are sectional views of additional views of the transducer assembly according to the invention.
Figure 8:
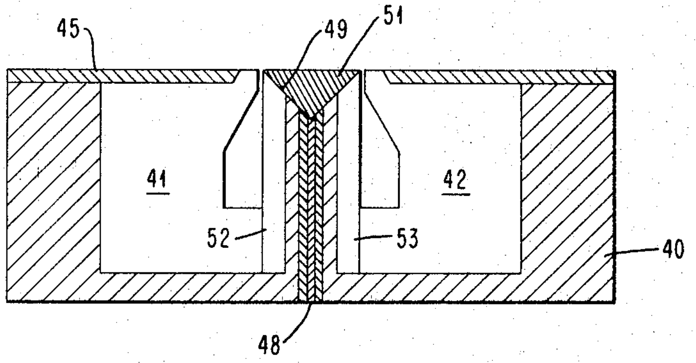
Figure 9:
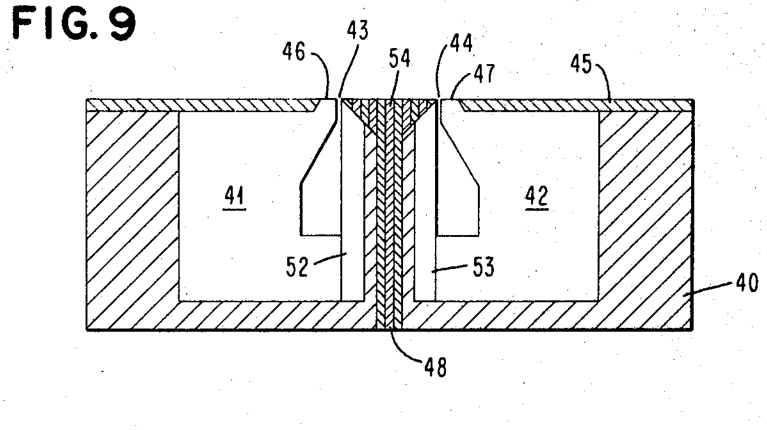

Additional embodiments of the invention which incorporate the use of a conductive shield element inlaid in the undercut portion of the record traversed face of the transducer are shown in FIGURES 7–9. Each of these assemblies comprises a supporting structure 40 formed of a write head element 41 and another head element 42. The head elements 41 and 42 define the transducing gaps 43 and 44, respectively. A conductive shield 45 is inlaid substantially co-extensively in the traversed surface of the head except for the portions between the two transducing gaps 43 and 44. These embodiments of the invention are particularly characterized by having the head laminations immediately adjacent to the transducing gaps formed in a skewed manner so as to reduce the area available in the write head laminations for radiating any electromagnetic energy and for preventing the other head laminations from receiving any of the radiating energy. The skewing of the corner of the pole pieces is indicated at 46 and 47, respectively.

Between the bank of write head elements and other head elements there is positioned the conventional Mumetal shield 48. This shield is formed with a V- or wedge-shaped gap 49 at the traversed surface of the transducer. A conductive shield 50 is inlaid in this gap.

In the embodiments of FIGURES 8 and 9, the head laminations protruding through the conductive shield 45 are also substantially reduced by skewing the corners of the pole pieces to reduce the effective radiating or radiation receiving area. To assist in the reduction of any "feedthrough" noise a wedge-shaped ferrite or cross-lamina (longitudinal or transverse) magnetic shield 51 is inserted into the V-shaped gap 49. The effect of this wedge-shaped shield is to reduce the exposed portions of the head pole pieces 52 and 53. Of a similar nature is the ferrite Mumetal shield 54 which is inserted between the pole pieces 52 and 53 in FIGURE 9. The triangular shape of the shield elements allows a larger area for the shield on the traversed surface of the head. This arrangement of shield laminations enables better noise reduction to occur at the lower frequencies of operation while the plating on the surface of the head reduces the noise at the higher frequencies of operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Tape transducing apparatus capable of operating in the megacycle frequency range without noise interference from electromagnetic radiation, comprising:

- a supporting structure of non-magnetic material having a face,
- a write head member and another head member, each of the head members having pole faces with a transducing gap formed between them,
- each of said pole faces being substantially undercut except for the portions of said pole faces immediately adjacent the transducing gap,
- first shield means disposed between the write head member and the other head member,
- the head members being disposed within the supporting structure to permit the undercut portions of the pole faces to be aligned with the face of said supporting structure, and
- second shield means integrally positioned between the head members and within the electromagnetic circuit of the head members for preventing electromagnetic radiation from the write head member from interfering with the other head member, said second shield means comprising a separate coating of conductive material inlaid over the face of the supporting structure and inlaid into the undercut portions of the pole faces of said head members so that said coating and the portions of said pole faces substantially adjacent said transducing gap form a surface over which a record tape may be moved.

2. The apparatus of claim 1, wherein the first shield means has a surface exposed through said layer of conductive material.

3. The apparatus of claim 2, wherein a plurality of write head members is arranged in a bank for writing information on a plurality of channels of the tape and a like number of other head members is arranged in a corresponding bank displaced from the bank of first head members, the second shield means acting to prevent electromagnetic radiation from the write head members from interfering with the other head members.

4. The apparatus of claim 2, wherein the first shield means comprises an arrangement of shielding laminations including interspersed magnetic and conductive laminations positioned transversely in the supporting structure between the first head member and the other head member, the laminations being positioned in planes with longitudinal axes parallel to the recording track of the record tape.

5. The apparatus of claim 2, wherein the first shield means comprises a wedge-shaped shielding element positioned between the pole pieces of the head members, the upper surface of said wedge-shaped element forming part of the surface traversed by the record member.

6. The apparatus of claim 1 wherein the conductive layer is composed of copper.

References Cited

UNITED STATES PATENTS

| | | | |
|---|---|---|---|
| 3,034,109 | 6/1962 | Maclay | 179—100.2 |
| 3,064,333 | 11/1962 | Kristiansen et al. | 179—100.2 |
| 2,846,517 | 8/1958 | Farrand et al. | 179—100.2 |
| 2,800,534 | 7/1957 | Bradford et al. | 179—100.2 |
| 2,761,911 | 9/1956 | Camras | 179—100.2 |

OTHER REFERENCES

IBM Technical Disclosure Bulletin, vol. 4, No. 11, p. 24, April 1962.

BERNARD KONICK, *Primary Examiner.*

A. I. NEUSTADT, *Assistant Examiner.*

U.S. Cl. X.R.

179—100.2; 346—74